Oct. 23, 1956  R. H. CUBBERLEY  2,768,091
PROCESS FOR PRODUCING COATED INSULATING MATERIAL
Filed April 10, 1952

INVENTOR.
RICHARD H. CUBBERLEY
BY
Edward J. Holley
ATTORNEY

United States Patent Office 2,768,091
Patented Oct. 23, 1956

2,768,091

PROCESS FOR PRODUCING COATED INSULATING MATERIAL

Richard H. Cubberley, Morris Township, Morris County, N. J., assignor to The Patent and Licensing Corporation, New York, N. Y., a corporation of Massachusetts Application April 10, 1952, Serial No. 281,585

1 Claim. (Cl. 117—11)

This invention relates to improvements in sound dampening compositions and products, and more particularly to a composition containing a rubbery material in a foamed state, as well as to a product of fibrous material coated with the composition.

In the automotive field it has been customary to utilize a coated or impregnated felt for sound dampening. Usually this insulating material has been a paper felt impregnated with asphalt and applied to the sheet metal body parts with an adhesive. Separately installed material is used for thermal insulation and sound absorption.

Foamed or sponge rubber compositions are known, but they do not have particularly good sound dampening qualities, as well as being comparatively high priced.

It is, therefore, an object of the present invention to provide an improved composition containing a rubbery material in cellular form.

It is a further object of the present invention to provide a composition having improved thermal, acoustic and waterproofing properties.

It is a further object of the present invention to provide a product combining sound dampening, thermal insulation and sound absorption properties.

These and other objects are attained by the present invention which is directed to a composition comprising a rubbery material and a bituminous material in cellular form. In its more specific embodiments, the invention relates to an insulating material comprising a web of fibrous material such as felt coated with a cellular composition of a rubbery material and a bituminous material, and to a method of preparing the insulating material.

The invention may be more clearly understood by reference to the following description of one specific embodiment of the invention as illustrated in the accompanying drawings. It will be understood that variations and substitutions may be made within the scope of the claim.

Figure 1:
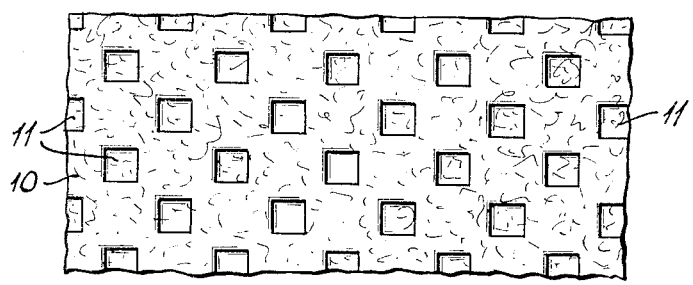

Fig. 1 is a plan view of the felt, viewed from the underside thereof. The felt 10 of fibrous material contains indentations 11 producing a waffle effect.

Figure 2:
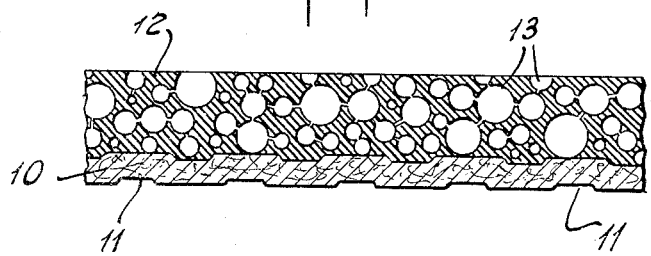

Fig. 2 is a cross-section of the felt shown in Fig. 1 wherein the felt base 10 with indentations 11 is covered by a relatively thick layer of rubbery-bituminous composition containing air cells 13.

In preparing the material, a dry porous machine-made paper felt, commonly used in the automotive industry, was first saturated with a soft asphalt flux and then embossed with a waffle pattern to provide a flexible base for the finished product. Specifically, 47.5 lbs. per 480 sq. ft. dry felt was saturated with 50% of its weight of a 75–95° F. softening point asphalt flux and run through a waffling roller to give mechanical flexibilizing.

A natural rubber latex of about 50% solids content with the usual curatives, antioxidants and foaming agents was mixed with an asphalt soap type emulsion of 185° F. melt point 10–12 penetration at 77° F. asphalt base of about 50% solids content. The latex and asphalt emulsion were proportioned in equal parts in a continuous foaming machine to which a suitable coagulant was subsequently added just prior to discharge on the surface of the above saturated felt. A uniform application of the foam was secured by a doctor bar with side cheek plates. The thickness of dried foam for most practical purposes is in the range of ¼ inch to ¾ inch. Minimum density is desirable.

The coated felt was dried in large flat sheets in a multiple deck oven of sufficient size to remove the water and effect a satisfactory cure for the rubber.

The following were the properties of the finished product: Overall density, 11.3 lbs. per cubic foot; thermal conductivity (K), 0.298 B. t. u. per square foot per °F. per hour per inch (74.7° F. mean temperature); sound dampening (Geiger plate method), 6 decibels decay rate per second.

Besides the asphalt used in the above example, other bituminous compositions may be used including coal tar pitch. The asphalt may be natural or a petroleum distillate or bitumen cracking product. Bituminous materials of various melting points and penetrations may be used, sometimes accompanied by substantial percentages of reclaim rubber dispersion.

A number of processes for the production of sponge rubber from aqueous dispersions of rubber are known and any of these may be used in the present process with the addition of the bituminous emulsion. For example, rubber latex has been treated with soluble carbonates from which carbon dioxide is liberated by the addition of an acid with simultaneous coagulation of the rubber, after which the mass may be vulcanized. According to another process, aqueous dispersions of rubber have been fixed with organic bases and solid ammonium carbonate, the moisture being then warmed until the ammonium salt has associated and the rubber solution coagulated. A number of processes are based on the concept of transforming aqueous dispersions of rubber containing suitable additives into foam by whipping, the foam being then solidified. The method of causing the dispersion to foam may be selected from any of these conventional methods.

In the preferred embodiment, the backing material is a paper felt which has been waffled. However, other webs of fibrous materials may be used, whether woven or felted, including wood or rag paper, bagasse, hair felt, asbestos paper or felt, cotton cloth, Fiberglas felted or woven, etc. While preferably the fibrous material is in a flexible condition and may be further flexed by creasing, waffling or the like, it may alternatively be in the form of a rigid board.

While natural rubber latex has been used in the example, latices of other rubbery materials, such as gutta percha, balata and the various synthetic rubbers including butadiene, butadiene styrene, butadiene acrylonitrile, chloroprene, isoprene, as well as rubbery compositions of isobutylene, vinyl chloride and vinyl acetate.

The amounts of the various materials may be varied over a wide range, but sufficient rubbery material should be utilized to provide the cellular structure of foam rubber and preferably to maintain flexibility of the sheet. In general, the rubbery material should be in the range of 2 to 8 parts for each 5 parts of bitumen and preferably equal parts.

While in the preferred example the cellular material is formed on the felt, it may also be formed in a mold to yield a self-sustaining sheet or mat. The greatest advantage of sound dampening together with sound absorbing is attained by the lamination of the cellular material to the felt with subsequent adhesion to metal as of an automobile body.

The curatives, anti-oxidants and foaming agents used in the process are those well known to the foam rubber art and do not particularly form a part of the present invention.

An unexpected result has been attained by the present invention. A synergistic effect has been discovered in that better sound dampening and thermal insulation is obtained than could be expected from the total value of each of the ingredients separately.

The various advantages over the present methods and products include the features that no molds are required for forming the cellular composition, no adhesive is required for holding the foam to the felt. A combination moisture resistant, heat insulating, sound dampening and sound absorbing material is obtained in one product produced in one operation. Saturated felt alone has a K value of only 0.50–0.60 and a sound dampening value of 2 decibels per second as compared with a K value of 0.298 and a sound dampening point of 6 decibels in the preferred example herein. The product of the present invention can be cemented to metal with the commercially used water type adhesives without impeding drying of the adhesive, thereby securing anchorage even in inverted position when automobile bodies are passed through bonderizing and paint ovens.

While the use of the composition of the present invention and preferably the combination of the composition with saturated felt has been described as applied to automobile bodies, the application is not limited thereto and such uses, such as sound deadeners for panels in ships and buildings as well as for the sound deadening of heating and ventilation ducts and airplane fuselages are among possible uses.

I claim:

A process for producing an improved flexible insulating material comprising impregnating a waffled paper felt with molten asphalt, foaming together a composition of 2 to 8 parts by weight of natural rubber in the form of an aqueous dispersion and 5 parts by weight of asphalt in the form of an aqueous dispersion, spreading said foam on said felt, and heat treating to cure the foam.

References Cited in the file of this patent

UNITED STATES PATENTS

| | | |
|---|---|---|
| 997,125 | Gleason | July 4, 1911 |
| 1,371,016 | Bennett | Mar. 8, 1921 |
| 1,899,535 | Teague | Feb. 28, 1933 |
| 2,096,398 | Hoover | Oct. 19, 1937 |
| 2,261,439 | Kelly | Nov. 4, 1941 |
| 2,271,058 | Binns | Jan. 27, 1942 |
| 2,313,507 | Billmeyer | Mar. 9, 1943 |